UNITED STATES PATENT OFFICE.

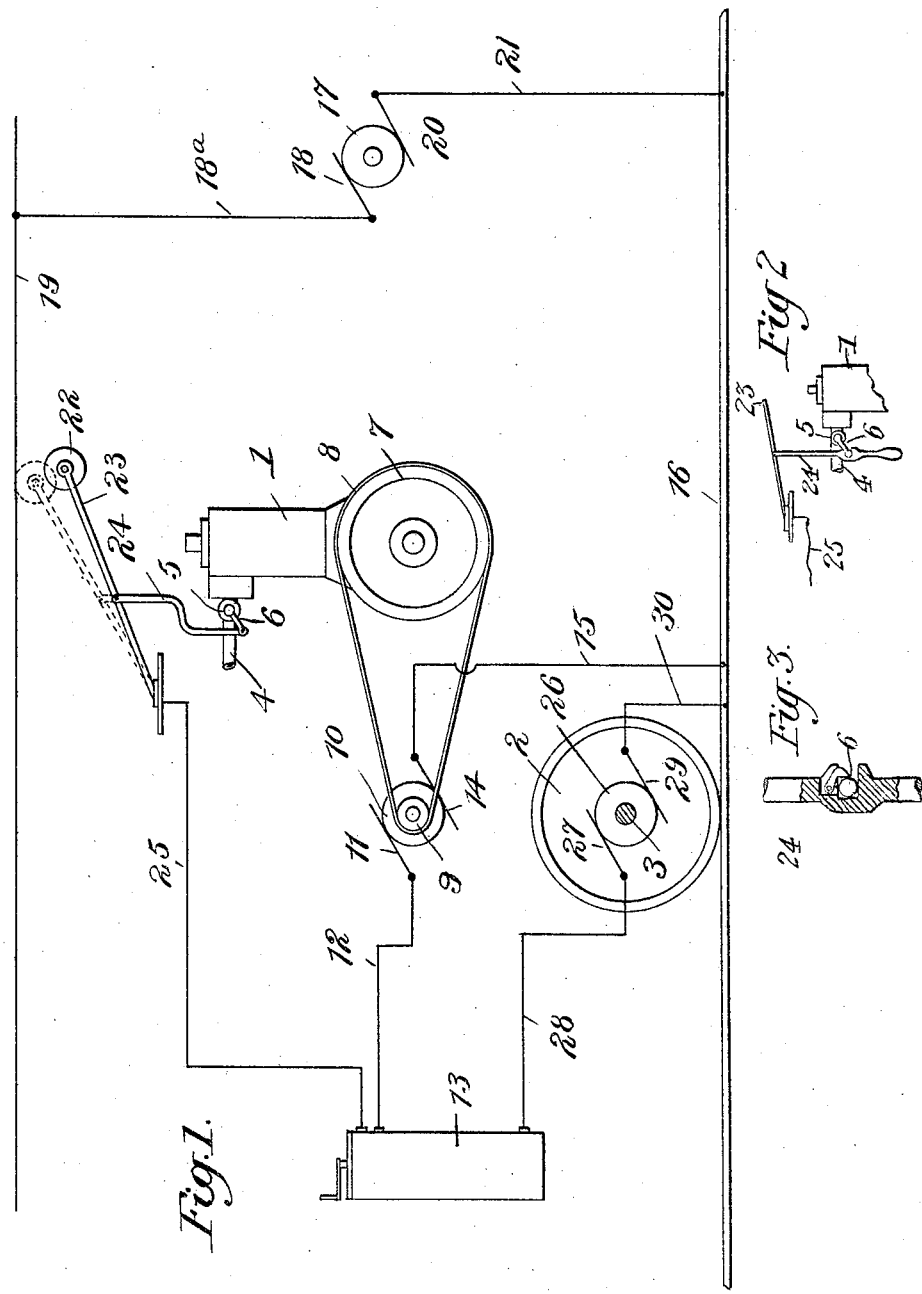

JOSEPH H. HOADLEY, OF NEW YORK, N. Y.

SYSTEM OF ELECTRIC RAILWAYS.

No. 807,029.  Specification of Letters Patent.  Patented Dec. 12, 1905.

Application filed September 16, 1904. Serial No. 224,765.

*To all whom it may concern:*

Be it known that I, JOSEPH H. HOADLEY, a citizen of the United States, residing in the borough of Manhattan, in the city, county, and State of New York, have invented certain new and useful Improvements in Systems of Electric Railways, of which the following is a specification.

My present invention relates to improved systems for electric railways.

The object of my invention is to provide a system in which a stationary source of electric power is provided for supplying a current to a suitable conductor adjacent a car in combination with a means of electrical generation aboard the car which may be brought into operation through disconnection of the car and the stationary source of power or which may be used coöperatively with or as an auxiliary to said stationary source of current-supply. Such a system is described in the following specification and diagrammatically shown in the accompanying drawings.

Figure 1 is a diagrammatic elevation of the apparatus. Fig. 2 is a detail diagram illustrating a detachable connection between the portable sources of electrical energy. Fig. 3 devices for cutting off the stationary and is a sectional diagram of a portion of the same on a larger scale.

In said drawings, 1 represents an internal-combustion engine or prime mover suitably mounted upon a car—such, for instance, as a motor-car traveling on wheels 2, having axles 3. Engine 1 is operated by a suitable source of gasolene-supply 4, controlled by a valve 5, having an arm 6 for operating the said valve. Engine 1 is provided with a band-pulley 7, carrying a belt 8, by means of which said pulley 7 is connected to and adapted to operate a pulley 9 on an electrical generator 10. Engine 1 may be otherwise geared to generator 10. Generator 10 is electrically connected, through brush 11 and wire 12, to a suitable controller 13—for instance, a series-multiple controller positioned on the car. Generator 10 is also connected electrically, through brush 14 and wire 15, with the track rail or rails 16, upon which wheels 2 travel, or other suitable return-conductor.

17 is a suitable stationary electrical generator connected, through brush 18 and wire 18ª, with third rail or trolley-wire 19 or other suitable conductor and connected by brush 20 and wire 21 to track or conductor 16.

22 is a contact-shoe carried by the car on support 23, by which said shoe is movable into and out of contact with third rail or conductor 19.

Support 23 may, if desired, be connected to arm 6 of valve 5 by a link 24 to operate said arm 6 and valve 5 upon operation of said support 23, or said support and arm may be left unconnected and arm 6 may be operated by hand or otherwise independently of support 23. Shoe 22 is connected electrically with controller 13 through support 23 and wire 25.

26 represents a motor or motors mounted upon the axles 3 of the car and connected electrically by brush 27 and wire 28 with controller 13 and to rail or rails 16 by brush 29.

Engine 1 may operate any number of generators 10. Generators 17 and 10 may operate any number of motors 26. There may be a single controller 13 for all of the motors and generators, or there may be separate controllers for the same. In the drawings I have illustrated a single motor for both generators and motors.

Operation: During the running of a car on level portions of track either the engine 1 on board the car or the stationary generator 17 at a distance from the car may be employed as a means of propulsion. On portions of the track where increased power is needed by reason of the muddy condition of the track, its grade, or in tunnels either the current from the stationary generator 17 or from the generator 10, operated by the engine 1, depending upon which of these sources is being utilized as the main source of propulsion, may be thrown in and utilized. In the drawings I have shown means for controlling the gasolene-supply by movement of the contact-shoe 22, thus, in fact, obtaining a control of said supply by said engine 1, depending upon the utilization of the stationary source of power. It will of course be obvious that by proper adjustment of the valve-arm 6 and the link 24 that the engine 1 may be either brought into or thrown out of operation at the same time that the stationary source of power is connected to the car. As stated, valve-arm 6 may be operated by hand or other means, so that the combination of the two sources of power will be left to the option of the car-operator.

If the valve and the trolley connection are so arranged that the gasolene connection is opened by the act of disconnecting the trolley 22 from the conductor 19, the trolley connection is made to supplement the power of the engine by simply disconnecting the link 24 from the valve-arm 6 and permitting the trolley 22 to move independently into contact with the conductor 19 in customary manner. It is alike obvious that when the link 24 and valve-arm 6 are thus disconnected both sources of power can be cut off by separate manipulation of the link 24 and the valve-arm 6.

A simple and common device for connecting and disconnecting the link 24 with the wrist of the valve-arm 6 is illustrated in Figs. 2 and 3.

What I wish to claim broadly in this application is the combination with a distant or stationary source of power for propelling the car of local source adapted to be combined with the distant or stationary source of power for purpose of increasing or doubling the speed of the car or assisting the same on grades, bad stretches of track, in tunnels, and anywhere else where increased power is required.

Having thus described my invention, the following is what I claim as new therein and desire to secure by Letters Patent:

1. In a system for electric railways, the combination with a car of a suitable electric generator and a prime motor therefor carried on said car, and a suitable electric generator independent of and adapted to be connected to said car.

2. In a system for electric railways, the combination with a car, an internal-combustion engine mounted on said car, and means of electric generation operated by said engine, suitable stationary source of electric generation adapted to be connected with the car, and a motor driven by either of said generators.

3. In a system for electric railways, the combination with a car, a combustion-engine on said motor, an electric generator operated by said engine, of an electric conductor adjacent the car, a suitable source of electric supply for said conductor, suitable connection between the car and the conductor, a motor for propelling the car and a controller interposed between the motor and the two sources of power.

4. A motor-car comprising a motor on its axle, a prime mover, an electric generator operated by said prime mover, and connected electrically with said motor, a contact device connected electrically to said motor, and a controller interposed between the generator and contact device and said motor, in combination with a stationary source of power and a conductor adjacent said car leading from said stationary source and in position to be engaged by said contact device.

5. A motor-car comprising an engine, an electric generator operated by said engine, a motor operated by current generated by said generator, a contact device on said car, means operated by movement of the contact device for shutting off the engine, and a controller interposed between the contact device, the generator and said motor in combination with a stationary source of power, and a conductor leading therefrom adjacent the car and in position to be engaged by said contact device.

JOSEPH H. HOADLEY.

Witnesses:
   Geo. E. Bouchie,
   Wm. R. Sheldon.